(12) United States Patent
Meredith et al.

(10) Patent No.: US 10,496,370 B2
(45) Date of Patent: Dec. 3, 2019

(54) ADAPTIVE ALPHANUMERIC SORTING APPARATUS

(71) Applicants: AT&T Mobility II LLC, Atlanta, GA (US); AT&T Intellectual Property I, L.P., Atlanta, GA (US)

(72) Inventors: Sheldon K. Meredith, Roswell, GA (US); William C. Cottrill, Canton, GA (US); Rick K. Tipton, Corryton, TN (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 578 days.

(21) Appl. No.: 14/957,035

(22) Filed: Dec. 2, 2015

(65) Prior Publication Data
US 2017/0161020 A1    Jun. 8, 2017

(51) Int. Cl.
| | | |
|---|---|---|
| G06F 7/36 | (2006.01) | |
| G06F 7/24 | (2006.01) | |
| G06F 5/14 | (2006.01) | |
| G06F 5/06 | (2006.01) | |

(52) U.S. Cl.
CPC ........... *G06F 7/36* (2013.01); *G06F 5/065* (2013.01); *G06F 5/14* (2013.01); *G06F 7/24* (2013.01); *G06F 2205/067* (2013.01); *G06F 2205/126* (2013.01)

(58) Field of Classification Search
CPC ..... G06F 15/76; G06F 17/00; G06F 17/30595
See application file for complete search history.

(56) References Cited

U.S. PATENT DOCUMENTS

| | | |
|---|---|---|
| 3,931,612 A | 1/1976 | Stevens et al. |
| 4,030,077 A | 6/1977 | Florence et al. |
| 4,132,314 A | 1/1979 | von Beckmann et al. |
| 4,298,957 A | 3/1981 | Duvall et al. |
| 4,261,034 A * | 4/1981 | Saccomano ............. G06F 13/24 710/49 |
| 4,464,732 A | 8/1984 | Clark |
| 4,750,149 A | 6/1988 | Miller |
| 4,907,186 A | 3/1990 | Racey |
| 4,939,639 A | 7/1990 | Lee et al. |
| 5,179,699 A | 1/1993 | Iyer et al. |

(Continued)

OTHER PUBLICATIONS

U.S. Appl. No. 14/869,374, filed Sep. 29, 2015, entitled "Sorting System," naming Sheldon K. Meredith and William C. Cottrill as inventors.

(Continued)

*Primary Examiner* — Getente A Yimer
(74) *Attorney, Agent, or Firm* — Zagorin Cave LLP

(57) ABSTRACT

A sorter receives a list of elements to be sorted. The elements are supplied to a communication bus. A plurality of processing modules are coupled to the communication bus and examine each list element supplied on the bus to see if the list element has a value that is within a range of values processed by the list element. The range of values of the list are subdivided to ranges allocated to the processing modules. When a processing modules determines an element in the bus is within its range, it stores the value and sorts the value in storage dedicated to storing a sorted list of values with the allocated range.

15 Claims, 4 Drawing Sheets

(56) References Cited

U.S. PATENT DOCUMENTS

| | | |
|---|---|---|
| 5,218,700 A | 6/1993 | Beechick |
| 5,600,825 A | 2/1997 | Atkins et al. |
| 5,905,387 A | 5/1999 | Chinosi et al. |
| 5,917,828 A | 6/1999 | Thompson |
| 6,073,128 A | 6/2000 | Pongracz et al. |
| 6,188,251 B1 | 2/2001 | Priemer et al. |
| 6,198,311 B1 | 3/2001 | Shi et al. |
| 6,199,084 B1 | 3/2001 | Wiseman |
| 6,289,509 B1 | 9/2001 | Kryloff |
| 6,310,740 B1 | 10/2001 | Dunbar |
| 6,366,911 B1 | 4/2002 | Christy |
| 6,741,999 B2 | 5/2004 | Wagner |
| 6,757,766 B1 | 6/2004 | Hutner et al. |
| 6,775,667 B1 | 8/2004 | Lewis et al. |
| 7,092,901 B2 | 8/2006 | Davis et al. |
| 7,177,319 B2 | 2/2007 | Buchert et al. |
| 7,197,498 B2 | 3/2007 | Perloff |
| 7,233,895 B2 | 6/2007 | Petty |
| 7,277,606 B1 | 10/2007 | Sakai |
| 7,450,588 B2 | 11/2008 | Chang et al. |
| 7,467,138 B2 | 12/2008 | Carroll |
| 7,689,541 B1 | 3/2010 | Le Grand |
| 7,711,603 B2* | 5/2010 | Vanker ............... G06Q 10/087 705/24 |
| 7,796,583 B1 | 9/2010 | Enderby |
| 7,870,159 B2 | 1/2011 | Carroll |
| 7,975,120 B2 | 7/2011 | Sabbatini, Jr. et al. |
| 8,014,270 B2 | 9/2011 | Halford et al. |
| 8,094,157 B1 | 1/2012 | Le Grand |
| 8,098,718 B2 | 1/2012 | Sienko et al. |
| 8,239,231 B2 | 8/2012 | Lian |
| 8,407,182 B2 | 3/2013 | Davydov |
| 8,700,614 B1 | 4/2014 | Diller et al. |
| 8,704,842 B1 | 4/2014 | Gaddy et al. |
| 8,832,115 B2 | 9/2014 | Smintina et al. |
| 8,964,771 B2 | 2/2015 | Tabatabaee et al. |
| 9,106,238 B1 | 8/2015 | Cronie et al. |
| 2002/0040362 A1 | 4/2002 | Lewis |
| 2002/0165707 A1 | 11/2002 | Call |
| 2002/0174222 A1 | 11/2002 | Cox |
| 2003/0061597 A1 | 3/2003 | Curtis et al. |
| 2005/0193174 A1* | 9/2005 | Arimilli ............... G06F 12/0831 711/118 |
| 2006/0123014 A1 | 6/2006 | Ng |
| 2006/0176901 A1 | 8/2006 | Terai et al. |
| 2007/0174124 A1 | 7/2007 | Zagofsky et al. |
| 2007/0279274 A1 | 12/2007 | Hsieh |
| 2008/0048641 A1 | 2/2008 | Makino |
| 2008/0208951 A1 | 8/2008 | Gotz et al. |
| 2008/0211544 A1 | 9/2008 | Makino |
| 2008/0215584 A1 | 9/2008 | Furusho |
| 2009/0103501 A1* | 4/2009 | Farrag ............... H04W 74/02 370/337 |
| 2009/0163223 A1* | 6/2009 | Casey ............... H04W 36/22 455/453 |
| 2009/0302232 A1 | 12/2009 | Grosholz |
| 2010/0031003 A1* | 2/2010 | Chen ............... G06F 9/30021 712/30 |
| 2010/0312995 A1 | 12/2010 | Sung |
| 2011/0093546 A1 | 4/2011 | Rubingh |
| 2013/0314101 A1 | 11/2013 | Belet |
| 2013/0346425 A1 | 12/2013 | Bruestle |
| 2014/0006665 A1 | 1/2014 | Amano et al. |
| 2014/0164652 A1 | 6/2014 | Pettijohn |
| 2014/0266487 A1 | 9/2014 | Vaishnav |
| 2014/0269684 A1 | 9/2014 | Fortune et al. |
| 2014/0281390 A1 | 9/2014 | Boland et al. |
| 2015/0134795 A1 | 5/2015 | Theimer et al. |
| 2015/0169585 A1 | 6/2015 | Korst et al. |
| 2017/0325065 A1* | 11/2017 | Azam ............... H04W 4/80 |

OTHER PUBLICATIONS

U.S. Appl. No. 14/924,005, filed Oct. 27, 2015, entitled "Analog Sorter," naming Sheldon K. Meredith and William C. Cottrill as inventors.

U.S. Appl. No. 14/957,049, filed Dec. 2, 2015, entitled "Sorting Apparatus," naming Sheldon K Meredith, William C. Cottrill, and Jeremy Fix as inventors.

Choi, Sung-Soon and Moon, Byung-Ro, "Isomorphism, Normalization, and a Genetic Algorithm for Sorting Network Optimization," Proceedings of the Genetic and Evolutionary Computation, Gecco, 2002, pp. 327-334.

Dewdney A.K., "Computer Recreations—On the Spaghetti Computer and Other Analog Gadgets for Problem Solving," Scientific American, pp. 19-26, Jun. 1984.

Rovetta, S. and Zunino, R., "Minimal-connectivity circuit for analogue sorting," IEE Proc.-Circuits Devices Syst., vol. 146, No. 3, Jun. 1999, pp. 108-110.

Xing, Huanlai and Qu, Rong, "A Nondominated Sorting Genetic Algorithm for Bi-Objective Network Coding Based multicast Routing Problems," Information Sciences, 233 (2013), pp. 23 pages.

Non-final Office action dated Dec. 7, 2017 in U.S. Appl. No. 14/957,049, filed Dec. 2, 2015, 23 pages.

Final Office action dated Jun. 28, 2018 in U.S. Appl. No. 14/957,049, filed Dec. 2, 2015, 25 pages.

Non-final Office action dated Apr. 4, 2018 in U.S. Appl. No. 14/869,374, filed Sep. 29, 2015, 36 pages.

* cited by examiner

ADAPTIVE ALPHANUMERIC SORTING APPARATUS

CROSS REFERENCE TO RELATED APPLICATIONS

This application is related to U.S. patent application Ser. No. 14/957,049 entitled "Sorting Apparatus," naming Sheldon K. Meredith et al. as inventors, filed the same day as this application, which application is hereby incorporated herein by reference.

BACKGROUND

Field of the Disclosure

This application relates to sorting and in particular to sorting using multiple processing modules.

Description of the Related Art

The widely accepted value for the minimum number of comparison operations to sort a large list of N items is N log 2(N). Sorting a very large list of one billion items, for example, still requires roughly 30B comparisons. Each of these comparisons can also require many clock cycles of the computing system. 30B comparisons might actually take 300B clocked operations. In Big Data analytics, weather prediction, nuclear calculations, astrophysics, genetics, public health, and many other disciplines, there is a frequent need to sort very large datasets. That implies computational resources than can literally fill buildings with racks of servers to service these sorting needs. To the extent one can improve on this N log 2(N) limitation, or otherwise improve sorting operations, one can improve on the capital infrastructure and associated operational costs for computing systems.

SUMMARY OF EMBODIMENTS

Accordingly, in an embodiment sorting apparatus to sort a list of elements includes ingest logic to receive the list of elements to be sorted. A communication channel is coupled to receive elements of the list from the ingest logic. A processing module stores each of the elements of the list on the communication channel having a value that is within a range of values assigned to the processing module and to notify the ingest logic that the element has been received from the communication channel.

In another embodiment a method includes receiving a list of elements to be sorted and supplying an element of the list to a communication channel. A plurality of processing modules compare the element on the communication channel to respective value ranges associated with the processing modules. One of the processing modules for which a value of the element is within an associated value range, stores the element.

In another embodiment a method of sorting a list of elements includes receiving a list of elements to be sorted at ingest logic. The ingest logic supplies the elements of the list to a communication channel in a random order. For each element supplied to the communication channel, one of a plurality of processing modules determines the element to be within a range of element values associated with the one of the plurality of processing modules. The one of the processing modules stores the element in sorted order in memory associated with the one of the plurality of processing modules and notifies the ingest logic that the element has been read from the communication channel.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
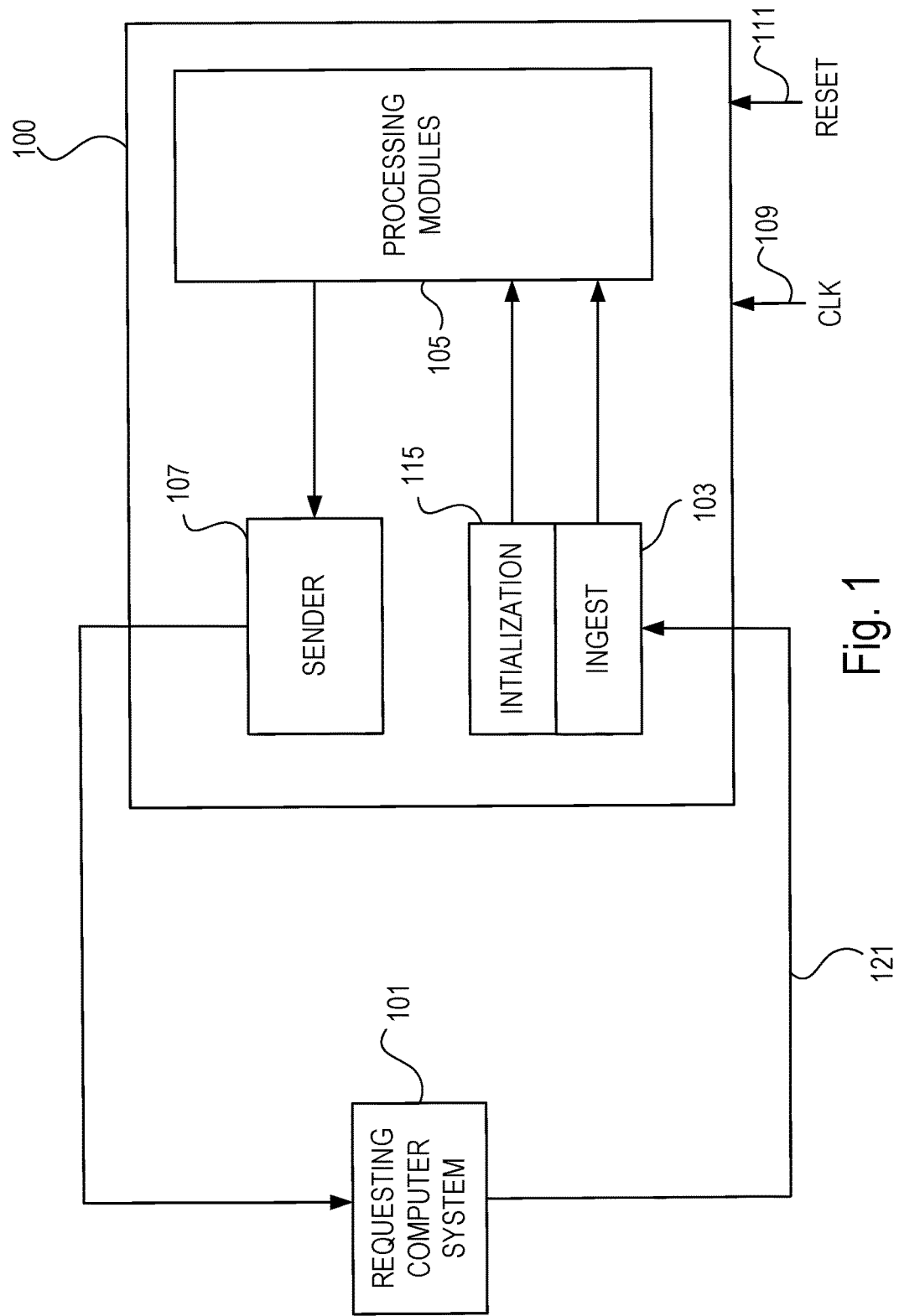
FIG. 1 illustrates a sorting system according to an embodiment.

Referring to FIG. 1, in an embodiment, an alphanumeric sorting apparatus 100 ingests an unsorted list of alphanumeric values of arbitrary length from a requesting computer system 101 and returns a sorted list of the same values to the requesting computer system 101. The sorting apparatus 100 includes ingest logic 103 to receive the list of alphanumeric values, a plurality of processing modules 105 to process the alphanumeric values and sender logic 107 to return the rank-ordered list back to the requesting apparatus 101. The sorting apparatus, in an embodiment, is able to sort any list of elements that can be digitally represented, so is cross-language and cross-character-set capable. The sorting apparatus 100 also receives a clock signal 109 and a reset signal 111

Figure 2:
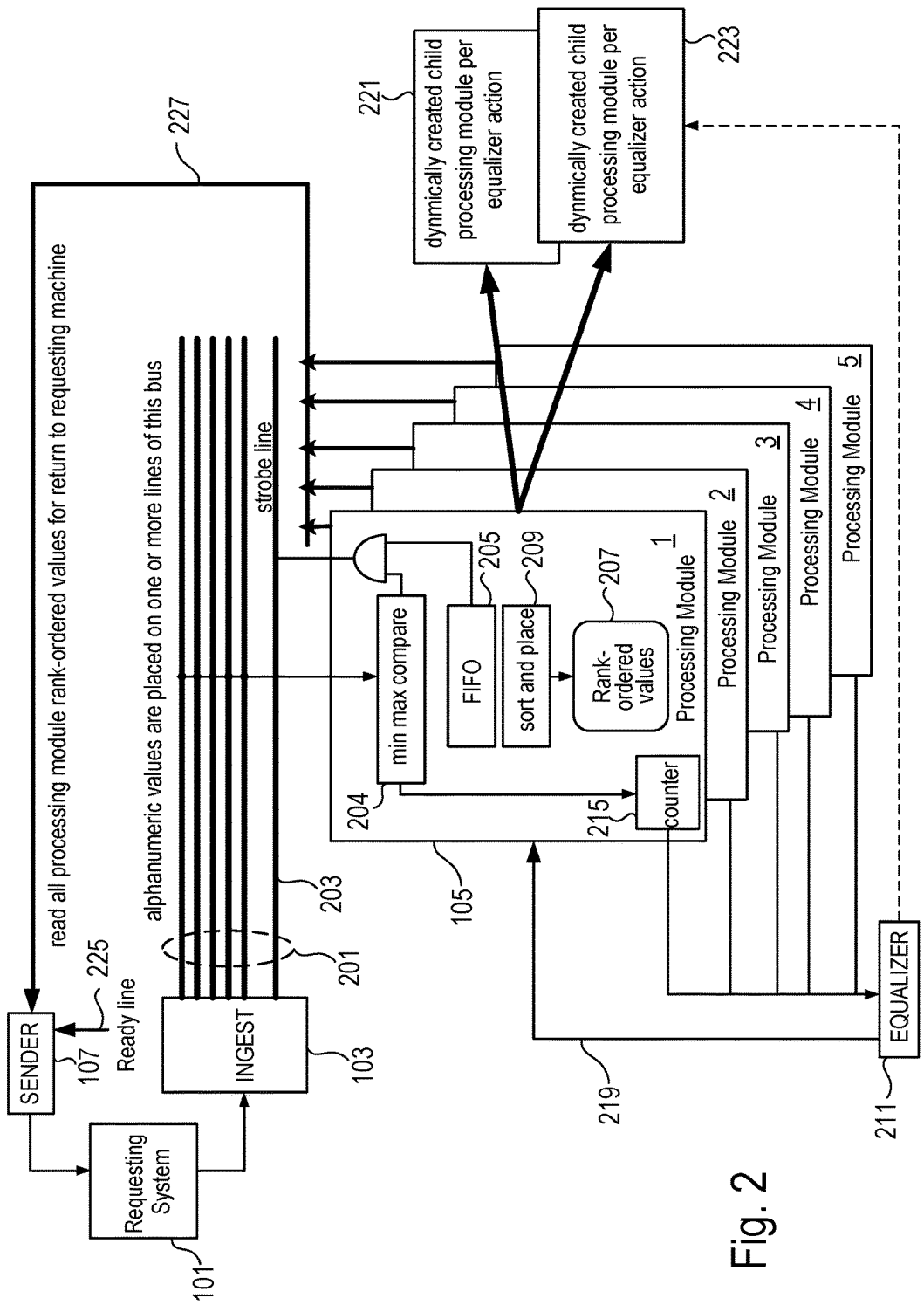
FIG. 2 illustrates additional details of an embodiment of the sorting system.

Referring to FIG. 2, an embodiment of the sorting apparatus 100 is shown in greater detail. The ingestion logic 103 may receive list elements one at a time or as a complete list from the requesting computer system 101. Regardless, the ingestion logic 103 serially places one element at a time (not necessarily in the order received) onto a communications bus 201 and then monitors a strobe or toggle line 203 on the bus to detect when a downstream process has taken the alphanumeric element off of the bus. Then the ingestion logic supplies the next list element onto the bus 203 and repeats this process until all elements of the list have been placed on the bus. The ingestion logic then waits for the very last toggling of the strobe line 203 to know that the last value has been picked up by one of the processing modules and asserts a complete indication to confirm that all list elements have been accepted by the processing modules.

A set of processing and storage modules 105 read elements from the communication bus 201. Each processing and storage module 105 has an associated range of alphanumeric values and when an element on the bus has a value within the range, the module accepts the element from bus 201 for sorting. To the extent the range of values in the list to be sorted is known in advance, the ingest logic may inform an initialization function 115 (see FIG. 1) which can, in turn, set the range for each of the processing and storage modules 105. Note that the initialization function 115 may be a part of the ingest logic 103. The initialization function may evenly divide the total possible range of alphanumeric values among a set of N modules 105. For instance, if the range of alphanumeric values goes from 00000000 to ZZZZZZZZ, and if 18 modules are assigned to sort values placed on the communications bus, then the first module handles the value range 00000000 to 11111111, while the last module handles the value range YYYYYYYY to ZZZZZZZZ. Alternatively, the initialization function may assign the ranges to the processing modules based on the range of element values, the type of elements, the number of elements, expected distribution of elements, or other information available. In typical embodiments, each processing and storage module 105 is assigned a unique range of list values to process.

Since each module 105 has its own range, whenever a module sees an alphanumeric list element available on the communications bus, the module 105 determines if the list element value is within the range of the module in compare logic 204. That determination may be accomplished by subtracting the list element value from both the minimum and maximum range of the module. If the sign of each of the subtraction results is the same, then the alphanumeric value is outside of the range. If one of the subtraction results is zero, then the list value is within the range of list values assigned to be processed by the module. If the signs of the subtractions results are different, the list value is within the value range assigned to the module.

If the value of the element is within the range of values processed by the module, the module stores the element in a FIFO 205 and then strobes the communication bus line 203 to inform the ingestion logic 103 that the element has been accepted. There will always be one processing module to accept any possible element value placed on the communications bus 201. Although the processing modules pull elements from their own FIFOs for further processing, it is possible for delays in processing to cause a FIFO to fill up in which case the module with a "match" will not toggle the strobe line until it has an open position in its FIFO. That will cause the entire process to wait for this condition to clear. One of skill in the art will understand that the likelihood of this stall occurring goes down with more modules assigned, with faster removal of values from the FIFOs, with deeper FIFOs, and with incoming data being more randomly distributed across the range of list values (not having similar values very close to each other). In an embodiment, the ingestion logic sends list values randomly (randomly is intended to refer to pseudorandom implementations of a desired random process) to the communications bus rather than sequentially in order of receipt to ensure good distribution of alphanumeric values, which then may lower the likelihood of a sequential series of list elements landing on the same processing module, depending of course on the distribution of the values within the list.

Within each module, a value coming out of the FIFO 205 must be sorted and placed within a set of alphanumeric values retained within that module in storage 207. The sort and place value logic 209 may utilize the difference between the value of the element being inserted and the high and low range values to interpolate an approximate place within these rank-ordered values in storage 207 in which to insert the new value in sorted order. A local sort insertion sort can then be used for accurate placement of the element in sorted order, but it is important to note that there should not be any elements out of order, so proper placement is certain. In other embodiments, any insertion sort algorithm, including a linear sort, may be utilized to insert the value in the storage 207 in sorted order. Duplicates may be handled by a field associated with each entry that tracks the number of times the element value has been processed by the module or by having sufficient storage 207 to handle duplicate entries.

When the insertion sort process in complete, the FIFO has one more position available to accept another value off of the communications bus.

One of skill in the art will appreciate that if the number of elements retained in a processing module is large, there is risk of the element placement process in the sorted list in storage 207 becoming time-consuming, which can in turn, cause the FIFO to accumulate elements and ultimately slow the overall list ordering process, e.g., if the FIFO repeatedly fills and cannot toggle the strobe line 203. Accordingly, in an embodiment, the length of the FIFO is dynamically adjusted as needed to match the needs of the module. That requires that storage be available to expand the FIFO if needed.

It may be advantageous to ensure one of the modules does not get overloaded with respect to any of the other processing modules to help ensure efficiency in sorting. In an embodiment, an equalizer function 211, which may be implemented as software executing on a processor, monitors how many elements are accepted by each module and when any one module accepts incoming list elements highly disproportionately, the equalizer function divides that processing module into two or more new processing modules and divides the parent module's range into suitable ranges for the new modules. Highly disproportionate means that a module is accepting a particular percentage more elements than the average module is accepting. The particular percentage can be determined by the number of processing modules that might be assignable to the overall sorting apparatus. The closer the particular percentage is to 0, the closer the apparatus will be to performing the sort at maximum efficiency. Thus, the particular percentage may be 5%, 10%, 20%, or some other percentage value depending such factors as available resources, size of the sort to be performed, and/or sensitivity to delay.

As an example of how the equalizer function works in an embodiment, assume a list of values where there are some random values scattered throughout the possible range, but there is a concentration in the middle of the possible range. Also assume that the sort starts with five modules (1-5) as shown in FIG. 2. Each module has a counter 215 that tracks the number of list values accepted by a module and supplies that number to the equalizer function 211.

Figure 3:
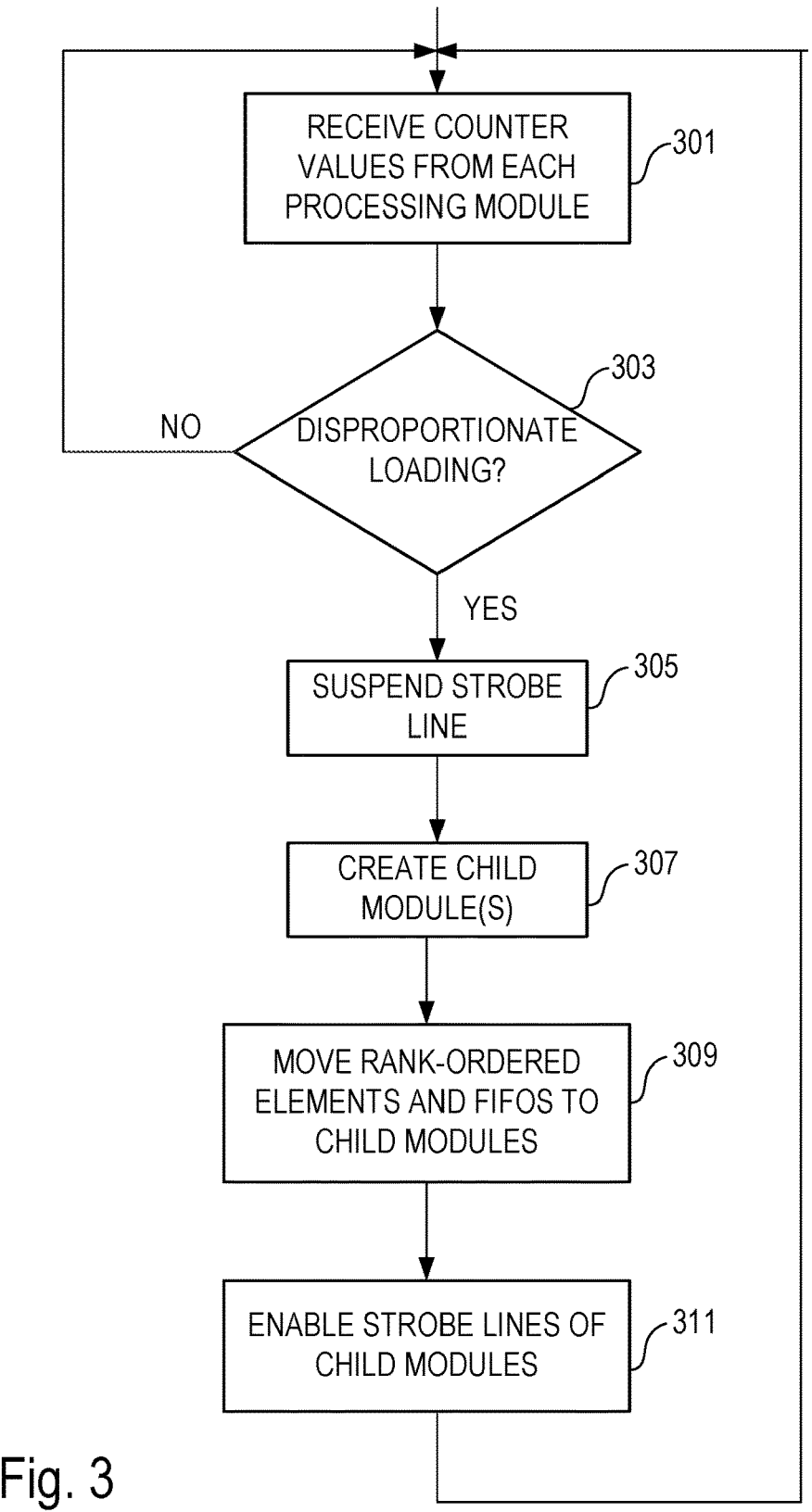
FIG. 3 illustrates a high level flow diagram of dynamically allocating additional processing modules to the sort according to an embodiment.

Referring to FIG. 3, a high level flow diagram illustrates the operation of the equalizer function 211. At 301, the equalizer receives counter values from each module. In 303, the equalizer checks if one (or more) of the modules in being disproportionately loaded. If not, the equalizer returns to 301 and continues to monitor the received count values and check for disproportionate loading in 303. After a certain number of values have been accepted, the equalizer function 211 sees module number three being disproportionately loaded in 303. Thus, the yes path is taken to 305. Keep in mind that if the ingestion logic 103 is randomizing elements placed onto the communications bus, any concentration of values is most likely due to concentration of those values throughout the whole list as opposed to a local concentration within the LIST. That randomization can help prevent the module from being split into multiple sub-modules when there was not a need to equalize sorting load. The equalizer 211, seeing that module 3 (the parent module) is being hit much more than the other modules (above a particular percentage, e.g., X %), first suspends the strobe line for module 3 in 305. That may be accomplished by the equalizer 211 sending a message to module 3 over communication line 219. The equalizer 211 in 307 then creates two or more child-modules 221 and 223 (see FIG. 2) and distributes the value range of module 3 to each of the child modules. For example, if module 3 had a range of 200-299, module 221 receives the range 200-249 and module 223 receives the range 250-299. Note that other modules can still accept elements off of the bus while this is happening. However, if an element is within the range of module 3, the strobe line will be disabled temporarily and prevent additional elements from being moved onto the bus 201.

Once the child modules are created, the parent module's rank-ordered values are moved into the child modules sequentially in 309. For example, the sorted elements with values between 200-249 go to module 221 and sorted elements with values between 250-259 go to module 223. Additionally, the FIFO contents of the parent module are moved to the FIFOs of the child modules. That requires that FIFO entries with values of 200-249 go to module 221 and FIFO entries with values between 250-299 go to module 223. Once that is complete, the parent module is removed from the set of modules assigned to the communications bus. The parent module no longer exists for processing purposes. However, its alphanumeric range, its rank-ordered values and its FIFO have all be re-assigned to child modules. When the parent module is eliminated, the strobe lines of the child modules are enabled in 311, allowing them to now accept list elements from the communications bus and the flow returns to monitoring loading of all the modules. With the parent module being divided into two child modules, there are now six processing and storage modules instead of five. Note that the ability to add modules assumes an environment, such as a data center with sufficient processing resources where additional modules (processing cores and associated storage) can be assigned to a particular sorting task as needed. In that environment, when a module such as module 3 is taken offline in the example above, that module is made available to other processing or sorting tasks being performed in the data center.

In other embodiments, a single module 221 may be added and module 3 kept to process a portion of the range it previously processed. For example, the range of module 3 may be changed to 200-249 and module 221 receives the range 250-299. In that case, the FIFO elements appropriate to the new range (200-249) may be kept and the remaining FIFO entries transferred to the newly allocated module 221. In addition, the sorted entries corresponding to the new range are kept and the other sorted entries are transferred to the newly instantiated module 221.

The continual monitoring and equalization continues as needed to ensure the number of values in each processing module is sufficiently equal, so as to improve the sorting efficiency of the apparatus. Referring back to FIG. 2, when the ingestion logic has no more values to supply and none of the processing modules has any remaining values in its FIFO (as determined by a bus line dedicated to this purpose), then the sorted list is ready to be supplied in rank-order to the SENDER 107. The SENDER function has a "ready line" 225 that indicates to the SENDER that the sort has been completed and that the SENDER may start reading the contents from each processing module sequentially. The ready line may be a logical AND of ready lines of all the modules indicating that their respective FIFOs are empty. The ready line 225 may be logically combined with the indication from the ingest logic 103 that all the list elements have been accepted by the processing modules. Other ways to communicate the ready status may be utilized, e.g., over bus 227 that supplies the sorted list values to the sender 107.

The sender 107 may also be implemented as programmed processing logic together with sufficient memory to store and supply the sorted list the requesting machine 101. Since the alphanumeric values retained in each processing module are already sorted, the values are simply read out sequentially over bus 227 until the module indicates it is finished. Then the SENDER logic 107 repeats this process for all remaining modules. The SENDER logic 107 may send the rank-ordered outputs sequentially back to the requesting system 101 or create a rank-ordered file and send the file. In the first case, an end-of-transmission notification would be sent to indicate that no more values remain to be sent.

In an embodiment, multiple values are placed onto the communications bus 201 in parallel by, e.g., having a bus width sufficient to accommodate multiple values. Each module may then be able to inspect each of these values in parallel. With a large number of processing modules and a well distributed set of values, that would improve the processing speed of the apparatus. In the limit, it is possible that a single module would need to accept all of the values presented in parallel and put them all into its FIFO, but this is still topologically consistent with the described processing methodology provided above.

The processing modules and other functionality described herein, such as the ingest logic, the initializer function, the sender function, and the equalizer function, may be implemented by one or more processors that execute software instructions stored in memory to perform various functions associated with sorting as described herein. As employed herein, the term "processor" can refer to substantially any computing processing unit or device comprising, but not limited to, single-core processors or multi-core processors.

Figure 4:
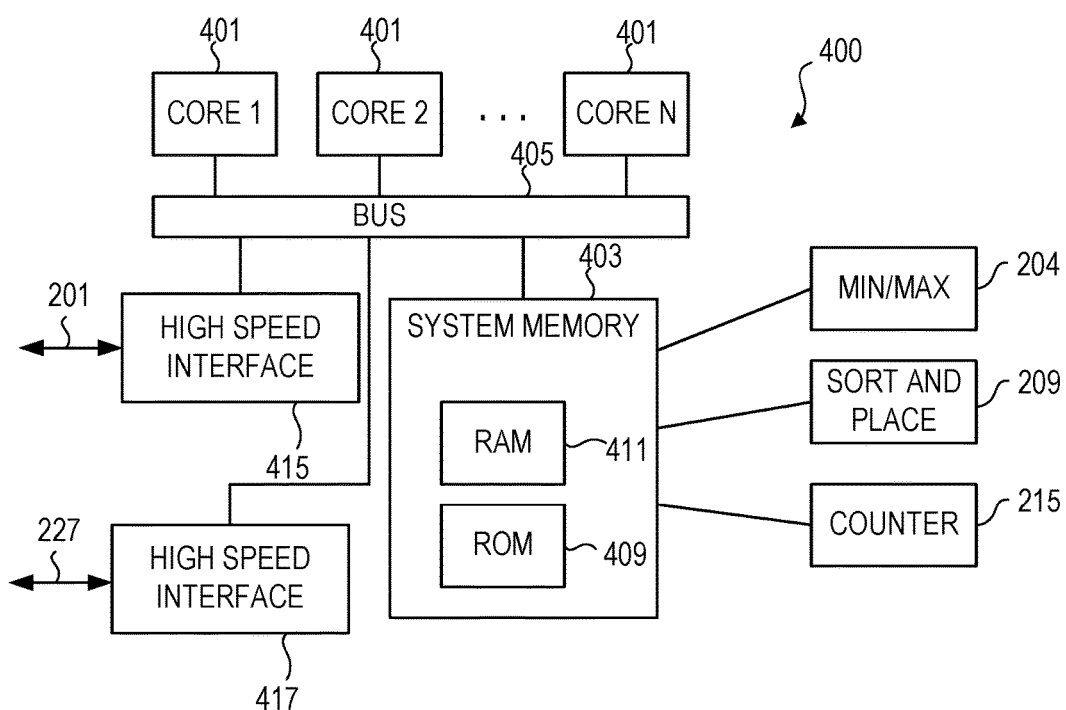
FIG. 4 illustrates a high level block diagram of processor system that may be utilized in one or more embodiments of the sorting system.

FIG. 4 illustrates a high level block diagram of an example processor system 400 operable to perform the sorting and associated functions described herein. The following description in conjunction with FIG. 4, is intended to provide a brief, general description of a suitable processing system 400, which can be used with one or more embodiments described herein. With reference again to FIG. 4, the processor system 400 includes one or more processing cores 401, a system memory 403 and a system bus 405. In an embodiment, each core is allocated a range of values to sort. The system bus may be used to couple various system components including, but not limited to, the system memory 403 to the cores 401. Cores 401 may include cache memory and the cache memory or portions of system memory 403 may be used to provide the FIFO 205 (FIG. 2) and the storage 207 (FIG. 2). The min/max compare function 204, the sort and place function 209, the counter 215, and other functionality described herein, may be implemented in software or program modules stored in system memory 403 and executed by the cores. The software or program modules are computer-executable instructions that operate on one or more of the cores 401 for performing the functions described herein. Generally, program modules include routines, programs, components, data structures, etc., that perform particular tasks. The system bus 405 can be any of several types of bus structures that can further interconnect to a memory bus (with or without a memory controller), a peripheral bus, and a local bus using any of a variety of commercially available bus architectures. The system memory 403 may include nonvolatile memory 409 and volatile memory 411. A basic input/output system (BIOS) can be stored in the non-volatile memory such as ROM, erasable programmable read only memory (EPROM), EEPROM, which BIOS contains the basic routines that help to transfer information between elements within the processor, such as during startup. As used herein, terms such as "memory", "storage," data storage," and substantially any other information storage component relevant to operation and functionality of a component, refer to any form of memory that can store information and be read by computers or processors or other electronic components. Memory may be volatile memory or nonvolatile memory, or both.

The processor system 400 also includes one or more external interfaces 415 to couple to, e.g., other processors in the system. Thus, interface 415 may provide an interface to bus 201. In addition, the processor system 400 may include interface 417 to interface to bus 227. In embodiments, the bus 201 (or 227) may be implemented as multiple point to point high speed interconnects such as a HyperTransport (HT) link. In such case, the ingest logic 103 may have multiple HT links. The ingest logic may broadcast list elements to all the processing modules 105 interconnected over HT link. In addition, the counter values from counter 215, and the strobe line 203 may be implemented as separate physical signal lines or as messages sent over any one or more of the communication links being utilized in the particular embodiment. Other communication channels and technologies are within contemplation of the embodiments described herein and may be utilized as needed in various embodiments. The systems and methods described herein can be implemented utilizing various commercially available operating systems or combinations of operating systems.

Note that the terms "first," "second," "third," and the like, as used in the claims does not typically indicate or imply a particular temporal order. For example, "a first action," "a second action," and "a third action," indicates three actions and not a particular order of the actions.

Thus, by employing the sort approach described above, improved sort efficiencies can be achieved. The description of the sort approach set forth herein is illustrative, and is not intended to limit the scope of the following claims. Variations and modifications of the embodiments disclosed herein may be made based on the description set forth herein, without departing from the scope of the following claims.

What is claimed is:

1. A sorting apparatus to sort a list of elements comprising:
   ingest logic to receive the list of elements to be sorted and to supply elements of the list;
   a communication channel coupled to receive the elements of the list from the ingest logic;
   a first processing module coupled to the communication channel and configured to store each element of the list that is on the communication channel and that has a value that is within a range of values assigned to the first processing module and is configured to provide a first notification to the ingest logic that the element has been stored by the first processing module;
   wherein the ingest logic is responsive to the first notification to supply another element of the list to the communication channel;
   a second processing module coupled to the communication channel and configured to store each element on the communication channel having a value within a second range of values assigned to the second processing module and to provide a second notification to the ingest logic each time an element on the communication channel within the second range of values is stored by the second processing module;
   wherein the ingest logic is responsive to the second notification to supply another element of the list to the communication channel; and
   wherein the ingest logic supplies the elements of the list to the communication channel in a random order with respect to an order received by the ingest logic.

2. The sorting apparatus as recited in claim 1 wherein the ingest logic supplies the elements of the list to the communication channel one element at a time.

3. The sorting apparatus as recited in claim 1 further comprising:
   a plurality of processing modules including the first processing module and the second processing module; and
   wherein each of the processing modules includes a first in first out (FIFO) buffer to store one or more list elements to be sorted.

4. The sorting apparatus as recited in claim 3 wherein each of the processing modules includes storage to store sorted values.

5. The sorting apparatus as recited in claim 3 wherein the processing modules respectively provide notifications to the ingest logic responsive to storing respective ones of the one or more list elements.

6. The sorting apparatus as recited in claim 3 wherein a length of the FIFO is dynamically adjusted according to loading of the FIFO.

7. The sorting apparatus as recited in claim 1 further comprising:
   a plurality of processing modules including the first processing module and the second processing module; and
   equalizer logic to monitor a number of list elements being handled by each of the processing modules.

8. The sorting apparatus as recited in claim 7 further comprising the equalizer logic responsive to loading of one of the processing modules being above a threshold loading, to allocate an additional one or more processing modules to sort at least a portion of a range being handled by the processing module.

9. A method for sorting a list of elements comprising:
   receiving a list of elements to be sorted;
   supplying an element of the list to a communication channel from ingest logic;
   a plurality of processing modules comparing the element on the communication channel to respective unique value ranges associated with the processing modules;
   a first processing module of the processing modules for which a value of the element is within a unique value range associated with the first processing module, storing the element;
   the first processing module providing a first notification to the ingest logic that the element from the communication channel has been stored in the first processing module;
   the ingest logic supplying a next element of the list to the communication channel responsive to the first notification;
   a second processing module of the processing modules for which a value of the next element is within a second unique value range associated with the second processing module, storing the next element;
   the second processing module providing a second notification to the ingest logic that the next element from the communication channel has been stored in the second processing module;
   the ingest logic supplying a second next element of the list to the communication channel responsive to the second notification; and the ingest logic supplying the elements of the list to the communication channel in a random order with respect to an order received by the ingest logic.

10. The method as recited in claim 9 further comprising the first processing module storing the element of the list in a first in first out (FIFO) buffer.

11. The method as recited in claim 10 further comprising the first processing module retrieving the element of the list from the FIFO and storing the element of the list in sorted order to a storage location storing elements of the list within the unique value range of the first processing module in sorted order.

12. The method as recited in claim 9 further comprising monitoring how many elements are accepted by each of the processing modules.

13. The method as recited in claim 12 further comprising equalizer logic responsive to loading of the first processing module storing a number of elements above a threshold, allocating an additional one or more processing modules to sort at least a portion of a range being handled by the first processing module.

14. The method as recited in claim 9 further comprising assigning respective unique value ranges for the processing modules based on a range of the elements of the list to be sorted.

15. A method of sorting a list of elements comprising:
receiving a list of elements to be sorted at ingest logic;
supplying the elements of the list to a communication channel from the ingest logic in a random order with respect to an order received by the ingest logic; and
for each element supplied to the communication channel, one of a plurality of processing modules determining the element to be within a range of list values assigned to the one of the plurality of processing modules, and the one of the plurality of processing modules storing the element in sorted order in memory associated with the one of the plurality of processing modules.

* * * * *